UNITED STATES PATENT OFFICE.

GUSTAV JEBSEN, OF CHRISTIANIA, NORWAY, ASSIGNOR TO TITAN CO. A/S., OF CHRISTIANIA, NORWAY.

ELIMINATION OF UNDESIRED ACID SUBSTANCES FROM TITANIUM HYDRATES AND THE PRODUCT OBTAINED THEREBY.

1,361,866.  Specification of Letters Patent.  Patented Dec. 14, 1920.

No Drawing.  Application filed October 12, 1917. Serial No. 196,978.

*To all whom it may concern:*

Be it known that I, GUSTAV JEBSEN, a subject of Norway, and a resident of Christiania, Kingdom of Norway, have invented certain new and useful Improvements in the Elimination of Undesired Acid Substances from Titanium Hydrates and the Product Obtained Thereby, of which the following is a specification, this application being a continuation in part of my application Sr. No. 156,988, filed March 23, 1917.

This invention relates to titanium compounds which are to be employed in the manufacture of pigments and the object of the invention is a novel treatment of the compounds whereby they may be rendered suitable for this purpose.

When solutions of titanium compounds are subjected to precipitation and the precipitates washed and dried, the latter have been found to contain certain substances of an acid character.

As an example, when titanium hydrate compounds are precipitated according to known methods from a solution of titanium sulfates, the precipitate thus obtained will in spite of energetic washing contain considerable sulfuric acid either in the form of a basic salt or adsorbed acid. In some cases more than 7 per cent. of the $SO_4$ radical is present in the resultant precipitate.

I have found that this acid substance renders the precipitate unsatisfactory for pigment use and have discovered certain methods whereby it may be eliminated.

One method of accomplishing this result consists in treating the precipitate of titanium compounds with a basic substance such as the alkaline compounds of sodium, potassium or ammonium. To assure the complete removal of the undesired acid substances present in the precipitate, I prefer to use a slight excess of the basic substance selected for this purpose. After the reaction has taken place the soluble salts formed together with the excess of basic substance employed, are removed by washing. If the basic substance employed is of such a nature that it cannot be readily removed in this manner, I add to the mass a dilute solution of an acid such as sulfuric or hydrochloric, in quantity just sufficient to neutralize the said excess, the acid employed being of such low concentration as not to act to any appreciable extent upon the titanium hydrates present, and then remove the dissolved materials by washing. This method and the product obtained thereby, however, form the subject-matter of another application Ser. No. 196,979 filed contemporaneously herewith and consequently no claims thereto are herein made.

Another method of bringing this about is by treating the precipitate with a solution of a compound, the metal of which will form an insoluble compound with the undesired acid present, and subsequently freeing the product from the second compound formed or liberated by the double decomposition. When the precipitate contains the $SO_4$ radical, I prefer to use the salts or hydroxids of barium or calcium for the purpose above outlined.

It is the last named method, in some cases combined with the first to a certain extent, which together with the products obtained thereby comprises the invention herein claimed. By way of illustration of this method I will make use of a titanium precipitate thrown down from a solution of titanium sulfate to be corrected by the use of barium chlorid, it being understood that these substances are chosen for illustrative purposes only and that my invention is by no means limited thereto. I will more specifically make use of precipitated titanium compounds from a solution prepared in accordance with United States Letters Patent 1,333,819, granted March 16, 1920, which corresponds with Norwegian Patent No. 27,292 of November 1, 1915, which solution I have found very well adapted for treatment in accordance with my present invention. No claim is here made to the said solution as such, nor to the process of preparing it, as the same forms the subject matter of the said Letters Patent.

The precipitate chosen for illustration is placed in a suitable container and carefully washed until the wash-water gives a practically neutral reaction. It is then allowed to settle and the water filtered off. A solution of barium chlorid is added to the washed precipitate, in amount not less than is required to combine with the $SO_4$ radical present, or if desired in slight excess thereof. The precipitate is thoroughly incorporated with the barium chlorid solution in any suitable manner as by boiling or mechanically stirring or grinding. The ultimate result of the reactions which thereupon take place is the formation of barium sulfate and free hydrochloric acid. Assuming that a small quantity of barium chlorid is present with the hydrochloric acid, both may be removed by washing when the resultant solution is ready for subsequent treatment, for example, drying or calcining, preparatory to the making of a pigment. If no barium chlorid is present obviously washing may be dispensed with if the product is to be calcined.

The final product comprises the barium sulfate formed as above and the titanium hydrate now free from the undesirable acid substance, and is particularly suitable for use in the manufacture of a pigment.

However, if the original precipitate contains a relatively large quantity of the undesired acid substance, so that the final product would contain such a large amount of the insoluble salt formed that the hiding power of the product is materially impaired, it may be desirable to avoid this by a preliminary treatment.

The preliminary treatment may conveniently comprise the subjecting of the original precipitate to washing, as already described, and thoroughly incorporating the washed precipitate with a small amount of a basic substance, the resultant compound of which is soluble, and is to be washed away. Basic substances such as sodium carbonate or ammonium hydroxid, etc., are suitable for this purpose and can be incorporated in the washed precipitate in the form of a solution in the same manner as above described. The quantity to be employed should be such as to leave that amount of the undesired acid substance, which when treated in accordance with the process of this invention, will result in the desired quantity of the insoluble salts in the final product. The soluble salts formed by this preliminary treatment can then be washed away and the remaining precipitate treated as above outlined.

Obviously the preliminary treatment may also be employed when even a small amount of the undesired acid substance is present in the precipitate and it is desired to have a correspondingly less quantity of the insoluble salt in the final product.

The word "hydrates" as used herein is applied as a general term and includes hydrated oxides with or without more or less basic salts or adsorbed acids.

The foregoing detailed description has been given for clearness of understanding and no undue limitation should be deduced therefrom, but the appended claims should be construed as broadly as permissible in view of the prior art.

What I claim as new and desire to secure by Letters Patent of the United States is:—

1. The process of treating precipitated titanium hydrates containing an undesired acid substance whereby the said undesired acid substance is eliminated, which comprises treating the precipitate with a compound of a metal which reacts with the said acid substance to form a neutral and relatively insoluble salt.

2. The process of treating precipitated titanium hydrates containing an undesired acid substance embracing the $SO_4$ radical whereby the said undesired acid substance is eliminated, which comprises washing the precipitate, and treating the washed precipitate with a soluble compound of a metal the sulfate of which is relatively insoluble and thereby forming a neutral and relatively insoluble salt, the quantity of the compound being sufficient to combine with all of the $SO_4$ radical present in the precipitate.

3. The process of treating precipitated titanium hydrates containing an undesired acid substance embracing the $SO_4$ radical whereby the said undesired acid substance is eliminated, which comprises washing the precipitate and treating the washed precipitate with a soluble compound of a metal the sulfate of which is relatively insoluble and thereby forming a neutral and relatively insoluble salt, the quantity of said compound employed being in excess of that required to combine with all of the $SO_4$ radical present in the precipitate, and removing the excess of the said compound by washing.

4. The process of treating precipitated titanium hydrates containing an undesired acid substance embracing the $SO_4$ radical whereby the said undesired acid substance is eliminated, which comprises washing the precipitate, and treating the washed precipitate with a soluble barium compound and thereby forming barium sulfate, the quantity of barium compound employed being sufficient to combine with all of the $SO_4$ radical present in the precipitate.

5. The process of treating titanium hydrates containing an undesired acid substance embracing the $SO_4$ radical whereby the said undesired acid substance is eliminated, which comprises washing the precipitate, treating the washed precipitate with barium chlorid and thereby forming a plurality of products, one being barium sulfate and one being hydrochloric acid, and removing the hydrochloric acid.

6. The process of treating precipitated titanium hydrates containing an undesired acid substance whereby the said undesired acid substance is eliminated, which comprises washing the precipitate, treating the washed precipitate with a basic substance in quantity less than is required to combine with the undesired acid substance and thereby forming a soluble salt, washing the resultant product to remove the soluble salt, and treating the washed product with a compound of a metal which reacts with the remaining undesired acid substance to form a neutral and relatively insoluble salt.

7. The process of treating precipitated titanium hydrates containing an undesired acid substance embracing the $SO_4$ radical whereby the said undesired acid substance is eliminated, which comprises washing the precipitate, treating the washed precipitate with a basic substance in quantity less than is required to combine with the $SO_4$ radical of the precipitate and thereby forming a soluble sulfate, washing the resultant product to remove the soluble salt, and treating the resultant product with a compound of a metal the sulfate of which is relatively insoluble and thereby forming a neutral and relatively insoluble salt, the quantity of the said compound employed being sufficient to combine with all of the $SO_4$ radical present in the said product.

8. As a new and useful article, a material suitable for use in the manufacture of pigments, comprising principally a hydrated oxid of titanium and a neutral and relatively insoluble salt of a metal, said material being formed by treating precipitated titanium hydrates containing an undesirable acid substance with a compound of the said metal which reacts with the said acid substance to form the said salt.

Signed at Christiania, Norway, this 14th day of September, 1917.

G. JEBSEN.